(12) United States Patent
Feng

(10) Patent No.: US 10,595,323 B2
(45) Date of Patent: Mar. 17, 2020

(54) METHOD FOR DATA STORAGE, TERMINAL DEVICE AND BASE STATION

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: Guangdong Oppo Mobile Telecommunications Corp., Ltd., Dongguan, Guangdfong (CN)

(*) Notice: Subject to any disclaimer, the term of this patent is extended or adjusted under 35 U.S.C. 154(b) by 0 days.

(21) Appl. No.: 15/738,047

(22) PCT Filed: Nov. 6, 2015

(86) PCT No.: PCT/CN2015/094048
§ 371 (c)(1),
(2) Date: Dec. 19, 2017

(87) PCT Pub. No.: WO2017/075825
PCT Pub. Date: May 11, 2017

(65) Prior Publication Data
US 2018/0310325 A1    Oct. 25, 2018

(51) Int. Cl.
*H04L 12/26* (2006.01)
*H04W 72/12* (2009.01)
(Continued)

(52) U.S. Cl.
CPC .............. *H04W 72/12* (2013.01); *H04L 1/08* (2013.01); *H04L 1/1835* (2013.01);
(Continued)

(58) Field of Classification Search
USPC .... 370/236, 242, 252, 328, 329, 381, 395.7, 370/395.72, 412
See application file for complete search history.

(56) References Cited

U.S. PATENT DOCUMENTS

| 8,908,498 B2 | 12/2014 | Lin |
| 2009/0245284 A1 | 10/2009 | Xu |

(Continued)

FOREIGN PATENT DOCUMENTS

| CN | 101572661 A | 11/2009 |
| CN | 102076023 A | 5/2011 |

(Continued)

OTHER PUBLICATIONS

English Translation of International Search Report in international application No. PCT/CN2015/094048 dated Jul. 28, 2016.

(Continued)

*Primary Examiner* — Kwang B Yao
*Assistant Examiner* — Nguyen H Ngo
(74) *Attorney, Agent, or Firm* — Ladas & Parry LLP; Hermine Valizadeh

(57) ABSTRACT

There is provided a method for data storage, comprising: a terminal device receives configuration signaling transmitted by a base station; the terminal device determines a first parameter according to the configuration signaling, wherein when the number of unsuccessfully decoded transport blocks (TBs) received by the terminal device is not less than the first parameter, the number of TBs stored by the terminal device in a buffer is not less than the first parameter. In this way, the terminal device can determine unsuccessfully decoded TBs to be stored according to the first parameter indicated by the configuration signaling transmitted by the base station when the number of the received unsuccessfully decoded TBs is not less than the first parameter, so that the utilization efficiency of a storage space can be improved.

11 Claims, 11 Drawing Sheets

---

A terminal equipment receives configuration signaling sent by a base station — S110

The terminal equipment determines a first parameter according to the configuration signaling, wherein a number of TBs stored in a buffer by the terminal equipment is not smaller than the first parameter when a number of TBs received by the terminal equipment and failed to be decoded is not smaller than the first parameter — S120

(51) Int. Cl.
  *H04L 1/18*   (2006.01)
  *H04L 1/08*   (2006.01)
  *H04W 16/14*   (2009.01)
  *H04W 88/02*   (2009.01)
  *H04W 88/08*   (2009.01)

(52) U.S. Cl.
  CPC ........... *H04L 1/1864* (2013.01); *H04W 16/14* (2013.01); *H04W 88/02* (2013.01); *H04W 88/08* (2013.01)

(56) References Cited

U.S. PATENT DOCUMENTS

| | | | |
|---|---|---|---|
| 2013/0047051 A1* | 2/2013 | Niewczas | H04L 1/1812 714/751 |
| 2013/0070652 A1 | 3/2013 | Li et al. | |
| 2013/0201815 A1* | 8/2013 | Lin | H04L 49/90 370/216 |
| 2014/0204892 A1* | 7/2014 | Oizumi | H04L 1/00 370/329 |
| 2016/0088635 A1* | 3/2016 | Davydov | H04L 1/1812 370/329 |
| 2016/0173262 A1* | 6/2016 | Davydov | H04W 72/082 370/329 |
| 2016/0227540 A1* | 8/2016 | Chen | H04L 5/001 |
| 2017/0201984 A1* | 7/2017 | Fu | H04L 1/1822 |
| 2017/0346606 A1* | 11/2017 | Li | H04L 1/1812 |
| 2018/0115395 A1* | 4/2018 | Jung | H04L 1/1812 |

FOREIGN PATENT DOCUMENTS

| | | |
|---|---|---|
| CN | 102469022 A | 5/2012 |
| CN | 103414543 A | 11/2013 |
| CN | 103684660 A | 3/2014 |
| JP | 2013532918 A | 8/2013 |
| WO | 2015065640 A1 | 5/2015 |

OTHER PUBLICATIONS

Written Opinion of the International Search Authority in international application No. PCT/CN2015/094048, dated Jul. 28, 2016.
Supplementary European Search Report in European application No. 15907667.8, dated Dec. 19, 2018.
NTT DOCOMO:"Soft Buffer Partitioning and, Rate Matching for Downlink CA", 3GPP Draft; R1-110555 Soft Buffer for CA Rev, 3rd Generation Partnership Project (3GPP), Mobile Competence Centre ; 650, Route Des Lucioles ; F-06921 Sophia-Antipolis Cedex ; France, vol. • RAN WGL No. Dublin, Ireland; Jan. 17, 2011, Jan. 24, 2011 (Jan. 24, 2011),XP050490433, [retrieved on Jan. 24, 2011] *paragraph [03.1 ] *.
English Translation of the Written Opinion of the International Search Authority in international application No. PCT/CN2015/094048, dated Jul. 28, 2016.
On May 16, 1. Intel Corporation,On number of soft channel bits and soft buffer management for CA with up to 32 component carriers [online], 3GPP TSG, the Internet <RAN WG1#81 R1-152627.zip> 152627, 2015 URL:http://www.3gpp.org/ftp/tsg_ran/WG1_RL1/TSGR1_81/Docs/R1.
First Office Action of the Chinese application No. 201580081109.5, dated Aug. 14, 2019.

\* cited by examiner

METHOD FOR DATA STORAGE, TERMINAL DEVICE AND BASE STATION

RELATED APPLICATION

This application is an application under 35 U.S.C. 371 of International Application No. PCT/CN2015/094048 filed on Nov. 6, 2015, the entire contents of which are incorporated herein by reference.

TECHNICAL FIELD

Embodiments of the disclosure relate to the field of communications, and more particularly, to a data storage method, a terminal equipment and a base station.

BACKGROUND

A Physical Downlink Share Channel (PDSCH) in a Long Term Evolution (LTE) system supports a Hybrid Automatic Repeat Request (HARQ) function, which can improve data transmission reliability. Specifically, after establishing a communication connection with a base station, a terminal equipment receives Downlink Control Information (DCI) from the base station and acquires scheduling information corresponding to the PDSCH. For example, the scheduling information may include contents such as locations and number of physical resources, a modulation and coding level and the like. Then, the terminal equipment receives the PDSCH according to the scheduling information, and demodulates and decodes a Transport Block (TB) born therein. In case of correct decoding, the terminal equipment feeds back Acknowledgement (ACK) information to the base station. In case of a decoding failure, the terminal equipment feeds back Negative Acknowledgement (NACK) information to the base station. Then, the base station retransmits the TB after receiving the NACK information.

The LTE system may use a Carrier Aggregation (CA) technology to implement bandwidth extension. That is, multiple LTE Component Carriers (CCs) are aggregated to achieve a larger transmission bandwidth.

A wireless cellular system extends a using frequency of the cellular system by virtue of an unlicensed frequency band, for example, a License Assisted Access (LAA) technology. The LAA technology implements aggregation of a licensed carrier and an unlicensed carrier.

Since a Listen Before Talk (LBT) technology is used for an unlicensed carrier and a terminal using unlicensed carriers is usually a low-speed or static terminal, it is usually considered that Block Error Rate (BLER) performance of single transmission on an unlicensed carrier is higher than BLER performance of single transmission on a licensed carrier.

However, unlicensed carriers are shared by multiple nodes, so that time for a base station to occupy an unlicensed carrier is limited. Therefore, the efficiency is low when determining a number and sizes of TBs stored in a terminal equipment and failed to be decoded by adopting a method of a conventional art, namely according to a number of aggregated carriers, is low.

SUMMARY

The embodiments of the disclosure provide a data storage method, to enable a terminal equipment to store TBs failed to be decoded more efficiently.

In a first aspect, there is provided a data storage method, which may include that: a terminal equipment receives configuration signaling sent by a base station; and the terminal equipment determines a first parameter according to the configuration signaling, a number of TBs stored in a buffer by the terminal equipment being not smaller than the first parameter when a number of TBs received by the terminal equipment and failed to be decoded is not smaller than the first parameter.

In other words, the first parameter is configured for the terminal equipment to determine a number of to-be-stored TBs which are failed to be decoded.

Furthermore, the method may further include that: the terminal equipment receives TBs sent by the base station, decodes the TBs therein, and determines the to-be-stored TBs which are failed to be decoded. according to the first parameter.

In such a manner, the terminal equipment may determine the to-be-stored TBs which are failed to be decoded. according to the first parameter indicated by the configuration signaling sent by the base station, so that utilization efficiency of a storage space may be improved, wherein the storage space may be the buffer.

Optionally, the configuration signaling may include the first parameter. Therefore, the terminal equipment may directly acquire the first parameter according to the configuration signaling.

Optionally, the configuration signaling may include a second parameter. Therefore, the terminal equipment may acquire the first parameter by calculation and the like according to the second parameter in the configuration signaling. Specifically, the terminal equipment may determine the first parameter to be $N_{num\_TB} = N_{refer} \times L$, where the first parameter may be represented as $N_{num\_TB}$, the second parameter may be represented as $N_{refer}$, and L may be a predefined constant.

In combination with the first aspect, in a first possible implementation mode, when the number of the TBs received by the terminal equipment and failed to be decoded is smaller than or equal to the first parameter, all the TBs received by the terminal equipment and failed to be decoded may be determined to be stored.

In combination with the first aspect, in a second possible implementation mode, when the number of the TBs received by the terminal equipment and failed to be decoded is larger than the first parameter, part or all of the TBs received by the terminal equipment and failed to be decoded are determined to be stored. That is, the number of the stored TBs failed to be decoded is larger than or equal to the first parameter.

Here, the terminal equipment may store the TBs received by the terminal equipment and failed to be decoded according to a priority sequence, wherein the TBs transmitted on a Primary Cell (PCell) and failed to be decoded may have a first priority, the TBs transmitted on a Secondary Cell (SCell) and failed to be decoded may have a second priority, and the TBs transmitted on an unlicensed carrier and failed to be decoded may have a third priority.

In combination with the first aspect, in a third possible implementation mode, the terminal equipment may determine a minimum to-be-stored bit number $n_{SB}$ of each Coded Block (CB) in the to-be-stored TBs which are failed to be decoded. according to the first parameter.

Optionally, the operation that the minimum to-be-stored bit number of each CB is determined may include that:

$n_{SB}$ is determined to be:

$$n_{SB} = \min\left(N_{cb}, \left\lfloor \frac{N'_{soft}}{C \cdot N_{num\_TB}} \right\rfloor\right),$$

where min may represent minimalization, $\lfloor \cdot \rfloor$ may represent rounding-down, $N_{cb}$ may represent a coded bit length input for the corresponding CB in a rate matcher of the base station, C may represent a number of the CBs included in the to-be-stored TBs which are failed to be decoded, $N'_{soft}$ may represent one of total lengths of multiple buffers reported by the terminal equipment, and $N_{num\_TB}$ may be the first parameter.

Optionally, the operation that the minimum to-be-stored bit number of each CB is determined may include that:

for a correctly decoded CB, it is determined that $$n_{SB} = \min\left(K_\Pi, \left\lfloor \frac{N'_{soft}}{C \cdot N_{num\_TB}} \right\rfloor\right),$$

and
for other CBs, it is determined that $$n_{SB} = \min\left(N_{cb}, \left\lfloor \frac{N'_{soft}}{C \cdot N_{num\_TB}} \right\rfloor\right),$$

where min may represent minimalization, $\lfloor \cdot \rfloor$ may represent rounding-down, $K_\Pi$ may represent a system information length of the corresponding CB, $N_{cb}$ may represent the coded bit length input for the corresponding CB in the rate matcher of the base station, C may represent the number of the CBs included in the to-be-stored TBs which are failed to be decoded, $N'_{soft}$ may represent one of the total lengths of the multiple buffers reported by the terminal equipment, and $N_{num\_TB}$ may be the first parameter.

In a second aspect, there is provided a CB storage method, which may include that:

a terminal equipment receives a TB sent by a base station, the TB including multiple CBs;

the terminal equipment determines to store the TB when the terminal equipment fails to decode the TB; and the terminal equipment determines a minimum to-be-stored bit number $n_{SB}$ of each CB in the TB, wherein the operation that the minimum to-be-stored bit number $n_{SB}$ of each CB in the TB is determined may include that:

for a correctly decoded CB, $n_{SB}$ is determined according to a system information length of the corresponding CB; and for other CBs, $n_{SB}$ is determined according to a coded bit length input for the corresponding CB in a rate matcher of the base station.

Here, the operation that $n_{SB}$ is determined according to the system information length of the corresponding CB for the correctly decoded CB may include that:

it is determined that $n_{SB}=\min(K_\Pi, P)$, where $K_\Pi$ may be the system information length of the corresponding CB, and a value of P may be predefined by a standard or configured by the base station or calculated according to a predetermined method.

Here, the operation that $n_{SB}$ is determined according to the coded bit length input for the corresponding CB in the rate matcher of the base station for the other CB may include that:

it is determined that $n_{SB}=(N_{cb}, Q)$, where $N_{cb}$ may be the coded bit length input for the corresponding CB in the rate matcher of the base station, and a value of Q may be predefined by a standard or configured by the base station or calculated according to a predetermined method.

In a third aspect, there is provided a method for data storage, which may include that: a base station determines a first parameter; and the base station sends configuration signaling to a terminal equipment, the configuration signaling being configured to indicate the first parameter, to make a number of TBs stored in a buffer by the terminal equipment not smaller than the first parameter when a number of TBs received by the terminal equipment and failed to be decoded is not smaller than the first parameter.

In other words, the first parameter is configured for the terminal equipment to determine a number of to-be-stored TBs which are failed to be decoded.

Optionally, the configuration signaling may include the first parameter. Therefore, the terminal equipment may directly acquire the first parameter according to the configuration signaling.

Optionally, the configuration signaling may include a second parameter. Therefore, the terminal equipment may acquire the first parameter by calculation and the like according to the second parameter in the configuration signaling. Specifically, the terminal equipment may determine the first parameter to be $N_{num\_TB}=N_{refer} \times L$, where the first parameter may be represented as $N_{num\_TB}$, the second parameter may be represented as $N_{refer}$ and L may be a predefined constant.

In a fourth aspect, there is provided a terminal equipment, which may include: a receiving unit, configured to receive configuration signaling sent by a base station; and a determination unit, configured to determine a first parameter according to the configuration signaling, a number of TBs stored in a buffer by the terminal equipment being not smaller than the first parameter when a number of TBs received by the terminal equipment and failed to be decoded is not smaller than the first parameter. The terminal equipment may be configured to execute each process executed by the terminal equipment in the method of the first aspect and the implementation modes thereof.

In a fifth aspect, there is provided a terminal equipment, which may include: a receiver, a processor and a memory, wherein the receiver may be configured to receive configuration signaling sent by a base station; the processor may be configured to determine a first parameter according to the configuration signaling; and the memory may be configured to store TBs failed to be decoded. The terminal equipment may be configured to execute each process executed by the terminal equipment in the method of the first aspect and the implementation modes thereof.

In a sixth aspect, there is provided a terminal equipment, which may include: a receiving unit, configured to receive a TB sent by a base station, the TB including multiple CBs; and a processing unit, configured to fail to decode the TB and determine to store the TB and further configured to determine a minimum to-be-stored bit number $n_{SB}$ of each CB in the TB, wherein the processing unit may specifically be configured to: for a correctly decoded CB, determine $n_{SB}$ according to a system information length of the corresponding CB, and for other CBs, determine $n_{SB}$ according to a coded bit length input for the corresponding CB in a rate matcher of the base station. The terminal equipment may be configured to execute each process executed by the terminal equipment in the method of the second aspect and the implementation modes thereof.

In a seventh aspect, there is provided a terminal equipment, which may include: a receiver, configured to receive a TB sent by a base station, the TB including multiple CBs; a processor, configured to fail to decode the TB and determine to store the TB and further configured to determine a minimum to-be-stored bit number $n_{SB}$ of each CB in the TB; and a memory, configured to store the TB, wherein the processor may specifically be configured to: for a correctly decoded CB, determine $n_{SB}$ according to a system information length of the corresponding CB, and for other CBs, determine $n_{SB}$ according to a coded bit length input for the corresponding CB in a rate matcher of the base station. The terminal equipment may be configured to execute each process executed by the terminal equipment in the method of the second aspect and the implementation modes thereof.

In an eighth aspect, there is provided a base station, which may include: a determination unit, configured to determine a first parameter; and a sending unit, configured to send configuration signaling to a terminal equipment, the configuration signaling being configured to indicate the first parameter, to make a number of TBs stored in a buffer by the terminal equipment not smaller than the first parameter when a number of TBs received by the terminal equipment and failed to be decoded is not smaller than the first parameter. The base station may be configured to execute each process executed by the base station in the method of the third aspect and the implementation modes thereof.

In a ninth aspect, there is provided a base station, which may include: a sender, a processor and a memory, wherein the processor may be configured to determine a first parameter; the sender may be configured to send configuration signaling to a terminal equipment, the configuration signaling being configured to indicate the first parameter and the first parameter being configured for the terminal equipment to determine a number of to-be-stored TBs of the TBs failed to be decoded; and the memory may be configured to store an instruction code executed by the processor. The base station may be configured to execute each process executed by the base station in the method of the third aspect and the implementation modes thereof.

In a tenth aspect, there is provided a computer-readable storage medium, which may store a program, the program enabling the terminal equipment to execute any data storage method of the first aspect and various implementation modes thereof.

In an eleventh aspect, there is provided a computer-readable storage medium, which may store a program, the program enabling the terminal equipment to execute any data storage method of the second aspect and various implementation modes thereof.

According to the embodiments of the disclosure, the terminal equipment receives the configuration signaling configured to indicate the first parameter from the base station, and when the number of the TBs practically failed to be decoded by a terminal is larger than the first parameter, the terminal determines that the number of the to-be-stored TBs which are failed to be decoded, is not smaller than the first parameter, so that storage efficiency may be improved, and utilization efficiency of the buffer may be improved.

BRIEF DESCRIPTION OF DRAWINGS

In order to describe the technical solutions of the embodiments of the disclosure more clearly, the drawings required to be used for descriptions about the embodiments or a conventional art will be simply introduced below. It is apparent that the drawings described below are only some embodiments of the disclosure. For those skilled in the art, other drawings may further be obtained according to these drawings without creative work.

DETAILED DESCRIPTION

Figure 1:
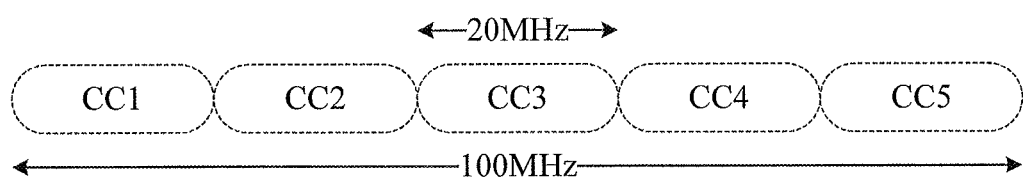
FIG. 1 is a schematic diagram of an LTE CA technology.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those skilled in the art on the basis of the embodiments in the disclosure without creative work fall within the scope of protection of the disclosure.

Terms "part", "module", "system" and the like as used in the specification are adopted to represent an entity, hardware, firmware, combination of hardware and software, software or software in execution related to a computer. For example, a part may be, but is not limited to, a process running on a processor, the processor, an object, an executable file, an execution thread, a program and/or a computer. It is illustrated that all applications running on computing equipment and the computing equipment may be parts. One or more parts may reside in a process and/or an execution thread, and the parts may be located on a computer and/or distributed across two or more computers. In addition, these parts may be executed in various computer-readable medium on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It is to be understood that the technical solutions of the embodiments of the disclosure may be applied to various communication systems, for example, a Global System for Mobile Communication (GSM), a Code Division Multiple Access (CDMA) system, a Wideband Code Division Multiple Access (WCDMA) General Packet Radio Service (GPRS) system, an LTE system, an LTE Frequency Division Duplex (FDD) system, LTE Time Division Duplex (TDD), a Universal Mobile Telecommunication System (UMTS), a Worldwide Interoperability for Microwave Access (Wi-MAX) communication system and a future 5th-Generation (5G) communication system.

Various embodiments are described in the disclosure in conjunction with a terminal equipment. The terminal equipment may communicate with one or more core networks through a Radio Access Network (RAN). The terminal equipment may refer to User Equipment (UE), an access terminal, a user unit, a subscriber station, a mobile radio station, a mobile station, a remote station, a remote terminal, mobile equipment, a user terminal, a terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal equipment in a future 5G network and the like.

Various embodiments are described in the disclosure in conjunction with a base station. The base station may be a device configured to communicate with the terminal equipment. For example, the base station may be a Base Transceiver Station (BTS) in a GSM or CDMA, or may be a NodeB (NB) in a WCDMA system, or may be an Evolutional Node B (eNB or eNodeB) in an LTE system. Alternatively, the base station may be a relay station, an access point, vehicle-mounted equipment, wearable equipment, network-side equipment in the future 5G network or the like.

Related technologies and concepts involved in the embodiments of the disclosure will be briefly introduced below.

CA Technology

With development of a communication technology, an LTE-Advanced (LTE-A) technology is evolved from an LTE technology. In an LTE-A Release 10 (R10) system, a CA technology comes into use for bandwidth extension. That is, at most 5 LTE carriers CC1~CC5 illustrated in FIG. 1 may be aggregated to achieve a transmission bandwidth of maximally 100 MHz. According to a capability of a terminal equipment and a volume of data transmitted by the terminal equipment, a base station may configure a number of carriers aggregated for transmission for each piece of a terminal equipment, and the aggregated carriers may be called as CCs.

For a terminal equipment, multiple aggregated CCs include: (1) a PCell and (2) SCells. Here, there is only one PCell. The terminal equipment executes an initial connection establishment process or a starts a connection reestablishment process on the PCell. The terminal equipment receives a common search space of a Physical Downlink Control Channel (PDCCH) only on the PCell. And the terminal equipment sends a Physical Uplink Control Channel (PUCCH) only on the PCell. Here, the other CCs except the PCell are all SCells. The terminal equipment may receive Downlink Control Information (DCI) and PDSCHs on the SCells and send Physical Uplink Share Channels (PUSCHs) on the SCells.

LAA Technology

At present, a wireless cellular system starts considering extension of a using frequency of the cellular system with an unlicensed frequency band (for example, frequency bands of 2.4 GHz and 5.8 GHz). Main technologies include an LAA technology. Main characteristics of the LAA technology include that: (1) the unlicensed frequency band is required to be aggregated with a licensed frequency band for use, and the unlicensed frequency band may only work as an SCell, and for better supporting the LAA technology, an LTE-A Release 13 (R13) system may support aggregation of at most 32 CCs; and (2) use of the unlicensed frequency band is not only limited to scheduling of a base station but also limited to a load of the unlicensed frequency band, that is, a competition mechanism is required by use of the unlicensed frequency band.

It is specified in a present standard that a base station is required to perform rate matching on each CB in each TB before sending, so as to obtain a bit length practically required to be transmitted. Here, a length of coding information, input into a rate matcher, of each CB is $N_{cb}$. The input coded bit length is represented by the following formula:

$$N_{cb} = \min\left(\left\lfloor \frac{N_{IR}}{C} \right\rfloor, K_w\right),$$

where in the formula, $$N_{IR} = \left\lfloor \frac{N_{soft}}{K_C \cdot K_{MIMO} \cdot \min(M_{DL\_HARQ}, M_{limit})} \right\rfloor, K_w = 3K_\Pi,$$

C is a number of CBs included in the TB, $K_\Pi$ is a system information length of the CB, and min represents minimalization.

$N_{soft}$ is one of total lengths of multiple buffers reported by a terminal equipment. Here, the base station selects one of the multiple total lengths to ensure consistency with an understanding of the terminal equipment. For a specific selection principle, reference may be made to Chapter 5.1.4.1.2 in an existing standard TS36.212, and the specific selection principle will not be elaborated herein. A value of $K_C$ is related to a level of the terminal equipment, $K_{MIMO}$ is a maximum TB number supported on a corresponding CC, $M_{DL\_HARQ}$ is a maximum HARQ process number on the CC, and $M_{limit}=8$.

After receiving data sent by the base station, the terminal equipment demodulates and decodes the TBs born therein. For TBs failed to be decoded, it is specified that a number of TBs to be stored by the terminal equipment and failed to be decoded is at least $K_{MIMO} \cdot \min(M_{DL\_HARQ}, M_{limit})$ when the number of the TBs failed to be decoded on each CC is not smaller than $K_{MIMO} \cdot \min(M_{DL\_HARQ}, M_{limit})$. For each CB in the stored TBs, at least $$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right)$$

bits are stored, where $N_{cells}^{DL}$ is a total number of CCs, and $N'_{soft}$ is one of the total lengths of the multiple buffers reported by the terminal equipment. Here, for a specific selection principle of the terminal equipment, reference may be made to descriptions about Chapter 7.1.8 in an existing protocol TS36.213, and the specific selection principle will not be elaborated herein.

Thus it can be seen that, in a process of storing the TBs failed to be decoded, the buffer of the terminal equipment is equally divided on the basis of the CCs at first, and then is equally divided on the basis of a transmission mode, a HARQ process number and the like in each CC.

However, unlicensed carriers are shared by multiple nodes, so that time for a base station to occupy an unlicensed carrier is limited. Therefore, efficiency of determining a number and sizes of TBs stored in a terminal equipment and failed to be decoded by adopting a method of a conventional art, namely according to a number of aggregated carriers, is low.

In the embodiments of the disclosure, the base station predefines a parameter, and then, when the number of the TBs practically failed to be decoded by the terminal equipment is larger than the parameter, the number of the TBs stored by the terminal equipment and failed to be decoded is at least the parameter. That is, in the embodiments of the disclosure, it is unnecessary to determine the number of the to-be-stored TBs which are failed to be decoded. according to a number of aggregated carriers, so that storage efficiency may be improved.

Figure 2:
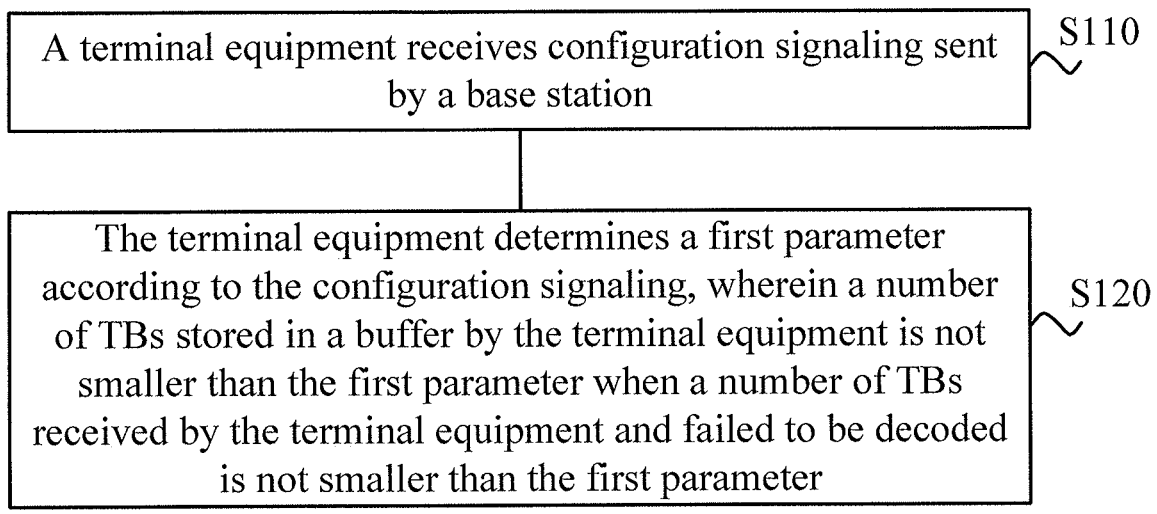
FIG. 2 is a schematic flowchart of a data storage method according to an embodiment of the disclosure.

Specifically, a data storage method provided by the embodiments of the disclosure may, as illustrated in FIG. 2, include the following operations.

In S110, a terminal equipment receives configuration signaling sent by a base station.

In S120, the terminal equipment determines a first parameter according to the configuration signaling. A number of TBs stored in a buffer by the terminal equipment is not smaller than the first parameter when a number of TBs received by the terminal equipment and failed to be decoded is not smaller than the first parameter.

In the embodiments of the disclosure, the terminal equipment determines that the number of the TBs stored in the buffer by the terminal equipment and failed to be decoded is not smaller than the first parameter when the number of the TBs received by the terminal equipment and failed to be decoded is not smaller than the first parameter according to the first parameter indicated by the configuration signaling sent by the base station, so that utilization efficiency of a storage space may be improved, wherein the storage space may be the buffer.

It can be understood that, before S110, the base station determines the first parameter at first, and then the base station sends the configuration signaling to the terminal equipment. Here, the configuration signaling is configured to indicate the first parameter.

Specifically, for different a terminal equipment, the first parameter determined by the base station also has different values.

Optionally, the base station may determine the first parameter according to at least one of the following factors: (1) a total number of aggregated carriers; (2) a total number of unlicensed carriers in the aggregated carriers; (3) a bandwidth of each CC; (4) a maximum HARQ process number in TDD CCs; and (5) a transmission mode on each CC. Here, the transmission mode may refer to a maximum space layer number, a maximum TB number and the like. Optionally, the base station may also determine the first parameter according to other factors which will not be limited one by one, which will not be limited in the disclosure.

As an implementation mode, the configuration signaling includes the first parameter. That is, the configuration signaling directly indicates a value of the first parameter. For example, a first field of the configuration signaling is filled with a value A. Then, the terminal equipment may determine that the read value is the value of the first parameter if the terminal equipment has read the value A from the first field of the configuration signaling. Here, the first field may be predetermined by the base station and the terminal equipment or predetermined by a protocol.

As another implementation mode, the configuration signaling includes a second parameter, and the first parameter may be determined according to the second parameter. That is, the configuration signaling indirectly indicates the value of the first parameter. For example, a second field of the configuration signaling is filled with a value B. Then, the terminal equipment may determine that the read value is a value of the second parameter if the terminal equipment has read B from the second field of the configuration signaling, wherein the second field may be predetermined by the base station and the terminal equipment or predetermined by a protocol.

Here, a relationship between the first parameter and the second parameter may be represented as follows:

the first parameter is represented as $N_{num\_TB}$, the second parameter is represented as $N_{refer}$, and then the relationship for determining the first parameter according to the second parameter is $N_{num\_TB}=N_{refer} \times L$, where L is a predefined constant.

Here, L is a constant, for example, L=8 or L=16. Specifically, a value of L may be predetermined by a protocol. Alternatively, the value of L may be configured to the terminal equipment by the base station. For example, the base station may notify the value of L to the terminal equipment through control signaling, scheduling signaling or the like.

In combination with the above descriptions, as an example, in S120, if the first field, read by the terminal equipment, of the configuration signaling is A, it can be known that the first parameter is $N_{num\_TB}=A$. If the second field, read by the terminal equipment, of the configuration signaling is B, it can be known that the first parameter is $N_{num\_TB}=A \times L$.

In such a manner, the terminal equipment may determine the number of the to-be-stored TBs which are failed to be decoded. according to the first parameter in a subsequent data transmission process after determining the first parameter in S120, and further store the TBs failed to be decoded.

That is, after S120, the method may include that: the terminal equipment determines the to-be-stored TBs which are failed to be decoded. after receiving the TBs sent by the base station.

After S120, the terminal equipment may receive data (for example, a PDSCH) sent by the base station and decode the TBs born therein. After decoding, the terminal equipment may obtain the number of the TBs practically failed to be decoded.

Specifically, if the number of the TBs practically failed to be decoded by the terminal equipment is smaller than or equal to the first parameter, it may be determined that the number of the to-be-stored TBs which are failed to be decoded. is equal to the number of the TBs practically failed to be decoded. Furthermore, the terminal equipment may store the TBs practically failed to be decoded.

That is, when the number of the TBs received by the terminal equipment and failed to be decoded is smaller than (or equal to) the first parameter, the terminal equipment determines to store all the TBs received by the terminal equipment and failed to be decoded.

It is to be noded that, in the embodiments of the disclosure, the same TB which is retransmitted for many times and fails every time is recorded as only one TB failed to be decoded. That is, different TBs in the TBs practically failed to be decoded are different from one another.

Specifically, if the number of the TBs practically failed to be decoded by the terminal equipment is larger than (or equal to) the first parameter, it may be determined that the number of the to-be-stored TBs which are failed to be decoded. is larger than or equal to the first parameter.

That is, when the number of the TBs received by the terminal equipment and failed to be decoded is larger than (or equal to) the first parameter, the terminal equipment determines to store part or all of the TBs received by the terminal equipment and failed to be decoded. That is, the number of the stored TBs failed to be decoded is larger than or equal to the first parameter. In other words, the terminal equipment stores at least $N_{num\_TB}$ TBs failed to be decoded.

It is to be noted that the above two descriptions are consistent for the condition that the number of the TBs received by the terminal equipment and failed to be decoded is equal to the first parameter, and both are as follows: the terminal equipment determines to store all the TBs received by the terminal equipment and failed to be decoded, that is, the number of the stored TBs failed to be decoded is equal to the first parameter.

In the embodiments of the disclosure, the first parameter may be considered as a minimum value of an upper limit of the number of the TBs stored in the buffer by the terminal equipment and failed to be decoded. Specifically, the first parameter refers to a minimum value of the number of the TBs stored by the terminal equipment and failed to be decoded when the number of the TBs practically failed to be decoded by the terminal equipment is not smaller than the first parameter.

For example, if the terminal equipment receives $N_{num\_fail}$ TBs failed to be decoded and $N_{num\_fail} > N_{num\_TB}$, after the terminal equipment determines that the number $N_{store\_NB}$ of the to-be-stored TBs which are failed to be decoded. meets $N_{num\_TB} \leq N_{store\_NB} \leq N_{num\_fail}$, the terminal equipment may store the TBs failed to be decoded.

Or, if the terminal equipment receives $N_{num\_fail}$ failed to be decoded and $N_{num\_fail} > N_{num\_TB}$, the terminal equipment may determine to store $N_{store\_NB}$ TBs failed to be decoded, wherein $N_{num\_TB} \leq N_{store\_NB} \leq N_{num\_fail}$.

Specifically, the terminal equipment may select $N_{store\_NB}$ from the $N_{num\_fail}$ TBs failed to be decoded for storage. Moreover, the terminal equipment discards the other $N_{num\_fail} - N_{store\_NB}$ TBs failed to be decoded.

Optionally, the terminal equipment may store the TBs failed to be decoded according to a priority sequence. Specifically, the TBs transmitted on a PCell and failed to be decoded may be preferably stored, then the TBs transmitted on an SCell and failed to be decoded are stored, and the TBs transmitted on an unlicensed carrier and failed to be decoded are finally stored.

That is, the TBs transmitted on the PCell and failed to be decoded have a first priority (highest priority), the TBs transmitted on the SCell and failed to be decoded have a second priority, and the TBs transmitted on the unlicensed carrier and failed to be decoded have a third priority.

Descriptions will be made below with $N_{store\_NB} = N_{num\_TB}$ as an example.

For example, there is made such a hypothesis that the $N_{num\_fail}$ TBs failed to be decoded include $N_{num\_licen}$ TBs transmitted on a licensed carrier, $N_{num\_pri}$ TBs transmitted on the PCell and $N_{num\_unlicen}$ TBs transmitted on the unlicensed carrier, $N_{num\_licen} + N_{num\_unlicen} = N_{num\_fail}$ and $N_{num\_pri} \leq N_{num\_licen}$.

Under the condition that $N_{num\_fail} > N_{num\_TB}$, the terminal equipment discards the TBs transmitted on the unlicensed carrier and failed to be decoded at first.

Here, if $N_{num\_fail} - N_{num\_unlicen} \leq N_{num\_TB}$, the terminal equipment discards $N_{num\_fail} - N_{num\_TB}$ TBs transmitted on the unlicensed carrier and failed to be decoded.

Furthermore, if the number of the to-be-stored TBs is still larger than $N_{num\_TB}$ after the terminal equipment discards all the TBs transmitted on the unlicensed carrier and failed to be decoded, that is, $N_{num\_fail} - N_{num\_unlicen} > N_{num\_TB}$, the terminal equipment may further discard part of the TBs transmitted on the licensed carrier and failed to be decoded.

Furthermore, if the number of the to-be-stored TBs is still larger than $N_{num\_TB}$ after the terminal equipment discards all the TBs transmitted on the licensed carrier and failed to be decoded, that is, $N_{num\_pri} > N_{num\_TB}$, the terminal equipment may further discard part of the TBs transmitted on the PCell and failed to be decoded.

Furthermore, the terminal equipment may determine a minimum to-be-stored bit number of each CB in the to-be-stored TBs which are failed to be decoded. according to the first parameter. The minimum number of the bits may be represented as $n_{SB}$.

Optionally, as an embodiment, $$n_{SB} = \min\left(N_{cb}, \left\lfloor \frac{N'_{soft}}{C \cdot N_{num\_TB}} \right\rfloor\right),$$

where min represents minimalization, $\lfloor \cdot \rfloor$ represents rounding-down, $N_{cb}$ represents a coded bit length input for the corresponding CB in a rate matcher of the base station, C represents a number of the CBs included in the to-be-stored TBs which are failed to be decoded, and $N'_{soft}$ represents one of total lengths of multiple buffers reported by the terminal equipment.

That is, $n_{SB}$ refers to a minimum value of an upper limit of a number of coded bits, stored in the buffer, of each CB in the TBs failed to be decoded. Specifically, when the coded bit length $N_{cb}$ input for a CB in a TB failed to be decoded in the rate matcher of the base station is larger than $n_{SB}$, the terminal equipment stores at least $n_{SB}$-bit coding information of the CB.

Optionally, as another embodiment, for a correctly decoded CB, $$n_{SB} = \min\left(K_\Pi, \left\lfloor \frac{N'_{soft}}{C \cdot N_{num\_TB}} \right\rfloor\right),$$

and for other CBs, $$n_{SB} = \min\left(N_{cb}, \left\lfloor \frac{N'_{soft}}{C \cdot N_{num\_TB}} \right\rfloor\right),$$

where min represents minimalization, $\lfloor \cdot \rfloor$ represents rounding-down, $K_\Pi$ represents a system information length of the corresponding CB, $N_{cb}$ represents the coded bit length input for the corresponding CB in the rate matcher of the base station, C represents the number of the CBs included in the to-be-stored TBs which are failed to be decoded, and $N'_{soft}$ represents one of the total lengths of the multiple buffers reported by the terminal equipment.

It can be understood that the other CB refers to a CB which is failed to be decoded or not decoded. Or, it may also be understood that the other CB is another CB except the correctly decoded CBs in the TBs.

As another understanding, if a second CB in a to-be-stored TB failed to be decoded is correctly decoded and a third CB in the to-be-stored TB failed to be decoded is failed to be decoded or not decoded, it may be determined that a minimum to-be-stored bit number of the second CB is $n_{SB1}$, and it is determined that a minimum to-be-stored bit number of the third CB is $n_{SB2}$, where $$n_{SB1} = \min\left(K_\Pi, \left\lfloor \frac{N'_{soft}}{C \cdot N_{num\_TB}} \right\rfloor\right), \text{ and}$$

$$n_{SB2} = \min\left(K_\Pi, \left\lfloor \frac{N'_{soft}}{C \cdot N_{num\_TB}} \right\rfloor\right).$$

That is, $n_{SB1}$ and $n_{SB2}$ refer to minimum values of the upper limit of the number of the coded bits, stored in the buffer, of each CB in the TB failed to be decoded. Specifically, when the coded bit length $N_{cb}$ input for a correctly decoded CB in the rate matcher of the base station is larger than $n_{SB1}$, the terminal equipment stores at least $n_{SB1}$-bit coding information of the correctly decoded CB. When the coded bit length $N_{cb}$ input for a CB which is failed to be decoded or not decoded in the rate matcher of the base station is larger than $n_{SB2}$, the terminal equipment stores at least $n_{SB2}$-bit coding information of the CB which is failed to be decoded or not decoded.

Specifically, there made such a hypothesis that the terminal equipment determines to store the first TB in the $N_{num\_fail}$ TBs failed to be decoded. Furthermore, the terminal equipment may determine a bit number of each CB in the first TB to be stored. It can be understood that the minimum value of the number of the bits, stored in the buffer, of each CB is determined in the embodiments of the disclosure.

As an example, it may be determined that the bit number of each CB in the first TB to be stored is $n_{SB}$. It can be understood that different CBs may correspond to different $n_{SB}$ because different CBs correspond to different $N_{cb}$.

As another example, if the first TB includes the second CB and the third CB, the terminal equipment successfully decodes the second CB and the terminal equipment fails to decode the third CB or does not decode the third CB, at this moment, it may be determined that the bit number of the second CB in the first TB to be stored is $n_{SB1}$, and it is determined that the bit number of the third CB in the first TB to be stored is $n_{SB2}$.

From the expressions about $n_{SB1}$ and $n_{SB2}$, it can be seen that $n_{SB1} < n_{SB2}$ because $K_\Pi < N_{cb}$. That is, for the second CB which is successfully decoded, the terminal equipment may only store its system information, and is not required to store check information, so that a larger buffer space is reserved for the CB which is failed to be decoded or not decoded.

For example, there is made such a hypothesis that a TB includes four CBs: CB1, CB2, CB3 and CB4, wherein, during decoding of the terminal equipment, CB1 and CB2 are correctly decoded, and CB3 and CB4 are failed to be decoded (or not decoded). A size of the buffer of the terminal equipment is supposed to be 1 TB.

Figure 3:
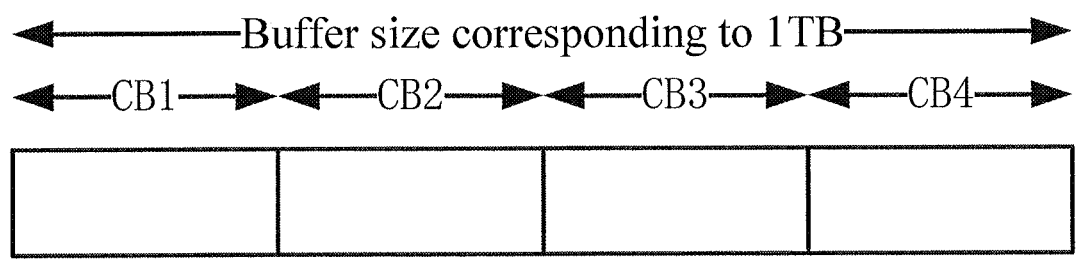
FIG. 3 is a schematic diagram of numbers of bits for storing CBs according to an embodiment of the disclosure.

As illustrated in FIG. 3, a bit number of the 4 CBs stored in the buffer is $n_{SB}$.

Figure 4:
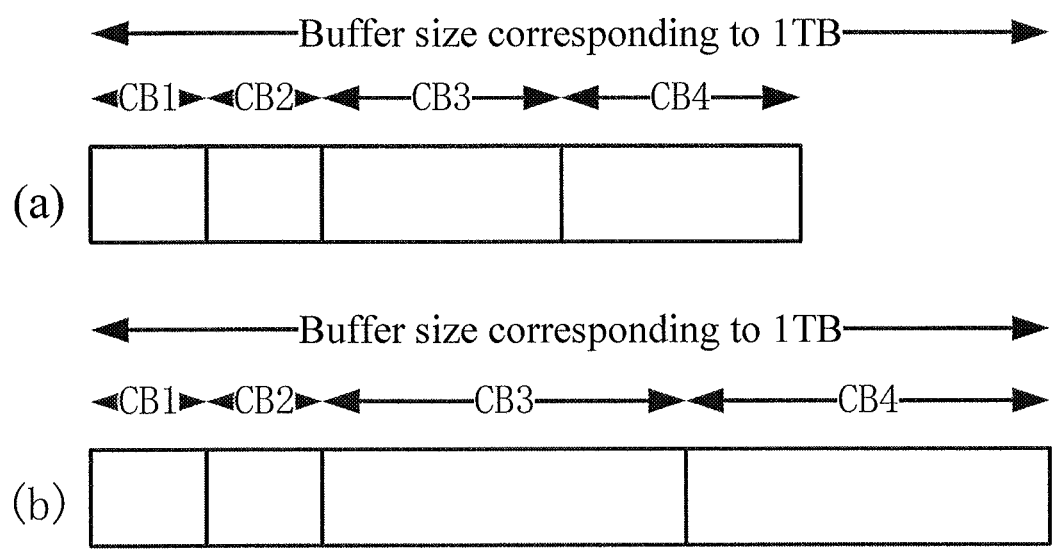
FIG. 4 is another schematic diagram of numbers of bits for storing CBs according to an embodiment of the disclosure.

As illustrated in FIG. 4, a bit number of CB1 and CB2 stored in the buffer is $n_{SB1}$, and a bit number of CB3 and CB4 is $n_{SB2}$. Therefore, a storage space of the buffer may be saved, as illustrated in (a) in FIG. 4. Or, therefore, CB3 and CB4 may store more check information, as illustrated in (b) in FIG. 4. Thus it can be seen that adopting different methods to determine the bit numbers for the CBs which are successfully decoded or failed to be decoded may increase a combined gain.

According to the embodiments of the disclosure, the terminal equipment receives the configuration signaling configured to indicate the first parameter from the base station, and when the number of the TBs practically failed to be decoded by a terminal is larger than the first parameter, the terminal determines that the number of the to-be-stored TBs which are failed to be decoded. is not smaller than the first parameter, so that storage efficiency may be improved, and utilization efficiency of the buffer may be improved.

Figure 5:
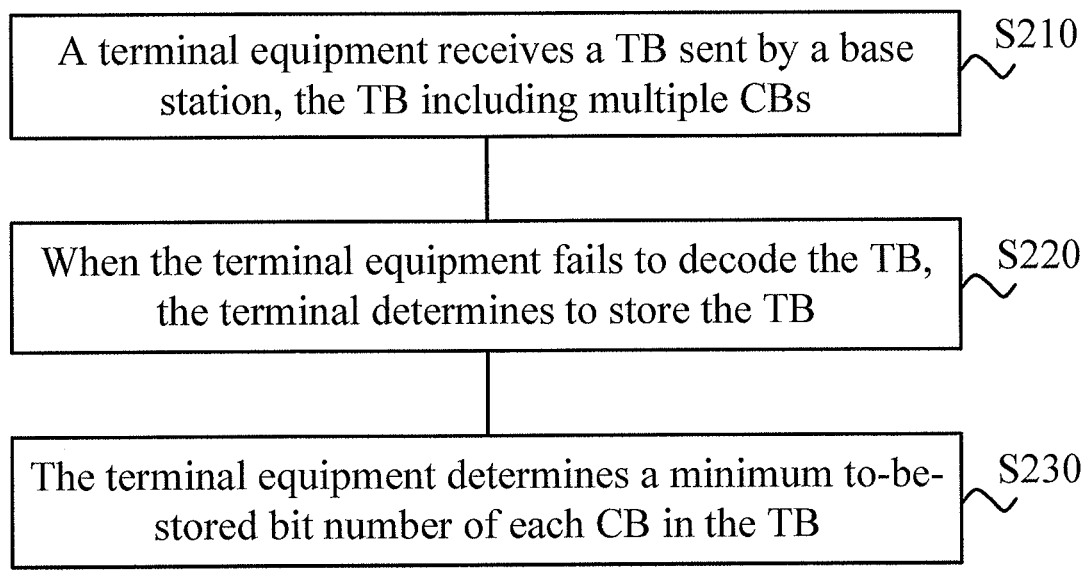
FIG. 5 is a schematic flowchart of a CB storage method according to an embodiment of the disclosure.

FIG. 5 is an adaptive flowchart of a CB storage method according to an embodiment of the disclosure. The method illustrated in FIG. 5 is executed by a terminal equipment, and the method includes the following operations.

In S210, the terminal equipment receives a TB sent by a base station, the TB including multiple CBs.

In S220, the terminal equipment determines to store the TB when the terminal equipment fails to decode the TB, and.

In S230, the terminal equipment determines a minimum to-be-stored bit number $n_{SB}$ of each CB in the TB.

Here, S230 includes that: for a correctly decoded CB, $n_{SB}$ is determined according to a system information length of the corresponding CB; and for other CBs, $n_{SB}$ is determined according to a coded bit length input for the corresponding CB in a rate matcher of the base station.

In the embodiment of the disclosure, no matter whether being successfully decoded or not, CBs have different minimum to-be-stored bit numbers, so that a storage space of a buffer may be saved, and a combined gain may be increased.

Optionally, the TB in S210 may be a TB transmitted on a PCell and failed to be decoded, or, may also be a TB transmitted on an SCell and failed to be decoded, which will not be limited in the disclosure.

It can be understood that the other CB refers to a CB which is failed to be decoded or not decoded. Or, it may also be understood that the other CB is another CB except the correctly decoded CB in the TB.

Optionally, for the successfully decoded CB, $n_{SB}$=min ($K_\Pi$, P), where $K_\Pi$ is a system information length of the corresponding CB, and a value of P is predefined by a standard or configured by the base station or calculated according to a predetermined method.

For example, the value of P may be a value predefined by the standard, and for example, is N1. For example, the value of P may be sent to the terminal equipment by the base station through control signaling and the like. For example, the method for calculating P may be predetermined by the base station and the terminal equipment. For example, the method for calculating P may be predetermined as follows:

$$P = \left\lfloor \frac{N'_{soft}}{C \cdot N_{num\_TB}} \right\rfloor,$$

or, $$P = \left\lfloor \frac{N'_{soft}}{C \cdot N_{cells}^{DL} \cdot K_{MIMO} \cdot \min(M_{DL\_HARQ}, M_{limit})} \right\rfloor,$$

where meanings of $N'_{soft}$, C, $N_{num\_TB}$, $K_{MIMO}$, $M_{DL\_HARQ}$, $M_{limit}$, and $N_{cells}^{DL}$ are as mentioned in the abovementioned embodiments, and will not be elaborated herein.

That is, for the correctly decoded CB, the minimum to-be-stored bit number is related to the system information length of the CB.

For the other CB, $n_{SB}=\min(N_{cb},Q)$, where $N_{cb}$ is the coded bit length input for the corresponding CB in the rate matcher of the base station, and a value of Q is predefined by a standard or configured by the base station or calculated according to a predetermined method.

For example, a value of Q may be a value predefined by the standard, and for example, is N2. For example, the value of Q may be sent to the terminal equipment by the base station through control signaling and the like. For example, the method for calculating Q may be predetermined by the base station and the terminal equipment. For example, the method for calculating P may be predetermined as follows:

$$Q = \left\lfloor \frac{N'_{soft}}{C \cdot N_{num\_TB}} \right\rfloor,$$

or, $$Q = \left\lfloor \frac{N'_{soft}}{C \cdot N^{DL}_{cells} \cdot K_{MIMO} \cdot \min(M_{DL\_HARQ}, M_{limit})} \right\rfloor,$$

where meanings of $N'_{soft}$, C, $N_{num\_TB}$, $K_{MIMO}$, $M_{DL\_HARQ}$, $M_{limit}$, and $N^{DL}_{cells}$ are as mentioned in the abovementioned embodiments, and will not be elaborated herein.

That is, for the other CB, the minimum to-be-stored bit number is related to the coded bit length input for the CB in the rate matcher of the base station (i.e. a sender).

It can be understood that, in the embodiment of the disclosure, the values of P and Q may be equal or unequal, which will not be limited herein.

Figure 6:
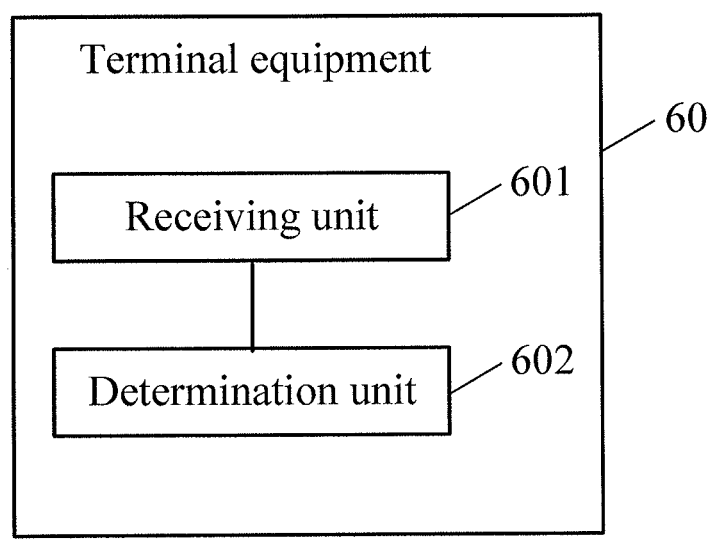
FIG. 6 is a schematic block diagram of a terminal equipment according to an embodiment of the disclosure.

FIG. 6 is a schematic block diagram of a terminal equipment according to an embodiment of the disclosure. The terminal equipment 60 in FIG. 6 includes a receiving unit 601 and a determination unit 602.

The receiving unit 601 is configured to receive configuration signaling sent by a base station.

The determination unit 602 is configured to determine a first parameter according to the configuration signaling received by the receiving unit 601, a number of TBs stored in a buffer by the terminal equipment 60 being not smaller than the first parameter when a number of TBs received by the terminal equipment 60 and failed to be decoded is not smaller than the first parameter.

In the embodiment of the disclosure, the terminal equipment determines to-be-stored TBs of the TBs failed to be decoded according to the first parameter indicated by the configuration signaling sent by the base station, so that utilization efficiency of a storage space may be improved.

Optionally, as an embodiment, the configuration signaling includes the first parameter. Then, the determination unit 602 may directly acquire the first parameter.

Optionally, as another embodiment, the configuration signaling includes a second parameter. Then the determination unit 602 may determine the first parameter to be $N_{num\_TB}=N_{refer} \times L$, where the first parameter is represented as $N_{num\_TB}$, the second parameter is represented as $N_{refer}$, and L is a predefined constant.

Here, a value of L may be predetermined by a protocol, or, the value of L may be configured to the terminal equipment by the base station. For example, the base station may notify it to the terminal equipment through control signaling, scheduling signaling or the like. It can be understood that the receiving unit 601 may further be configured to receive control signaling or scheduling signaling sent by the base station, and the control signaling or the scheduling signaling includes the value of L.

Furthermore, the determination unit 602 may further be configured to: after TBs sent by the base station are received, determine to-be-stored TBs which are failed to be decoded.

It can be understood that the receiving unit 601 may further be configured to receive the TBs sent by the base station.

Optionally, as an example, the determination unit 602 is specifically configured to: when the number of the TBs received by the terminal equipment 60 and failed to be decoded is smaller than (or equal to) the first parameter, determine to store all the TBs received by the terminal equipment and failed to be decoded.

Optionally, as another example, the determination unit 602 is specifically configured to: when the number of the TBs received by the terminal equipment 60 and failed to be decoded is not smaller than the first parameter, determine to store part or all of the TBs received by the terminal equipment and failed to be decoded.

Furthermore, the determination unit 602 may further be configured to: determine a minimum to-be-stored bit number $n_{SB}$ of each CB in the to-be-stored TBs which are failed to be decoded. according to the first parameter.

Optionally, the determination unit 602 is specifically configured to: determine that $$n_{SB} = \min\left(N_{cb}, \left\lfloor \frac{N'_{soft}}{C \cdot N_{num\_TB}} \right\rfloor\right),$$

where min represents minimalization, $\lfloor \cdot \rfloor$ represents rounding-down, $n_{cb}$ represents a coded bit length input for the corresponding CB in a rate matcher of the base station, C represents a number of the CBs included in the to-be-stored TBs which are failed to be decoded, and $N'_{soft}$ represents one of total lengths of multiple buffers reported by the terminal equipment.

Optionally, the determination unit 602 is specifically configured to: for a correctly decoded CB, determine that $$n_{SB} = \min\left(K_\Pi, \left\lfloor \frac{N'_{soft}}{C \cdot N_{num\_TB}} \right\rfloor\right),$$

and for other CBs, determine that $$n_{SB} = \min\left(N_{cb}, \left\lfloor \frac{N'_{soft}}{C \cdot N_{num\_TB}} \right\rfloor\right),$$

where min represents minimalization, $\lfloor \cdot \rfloor$ represents rounding-down, $K_\Pi$ represents a system information length of the corresponding CB, $N_{cb}$ represents the coded bit length input for the corresponding CB in the rate matcher of the base station, C represents the number of the CBs included in the to-be-stored TBs which are failed to be decoded, and $N'_{soft}$ represents one of the total lengths of the multiple buffers reported by the terminal equipment.

Moreover, the terminal equipment 60 may further include a storage unit, configured to: store the TBs received by the terminal equipment and failed to be decoded according to a priority sequence. Specifically, the TBs transmitted on a PCell and failed to be decoded may be preferably stored, then the TBs transmitted on an SCell and failed to be decoded are stored, and the TBs transmitted on an unlicensed carrier and failed to be decoded are finally stored.

That is, the TBs transmitted on a PCell and failed to be decoded have a first priority (highest priority), the TBs transmitted on the SCell and failed to be decoded have a second priority, and the TBs transmitted on an unlicensed carrier and failed to be decoded have a third priority.

Figure 7:
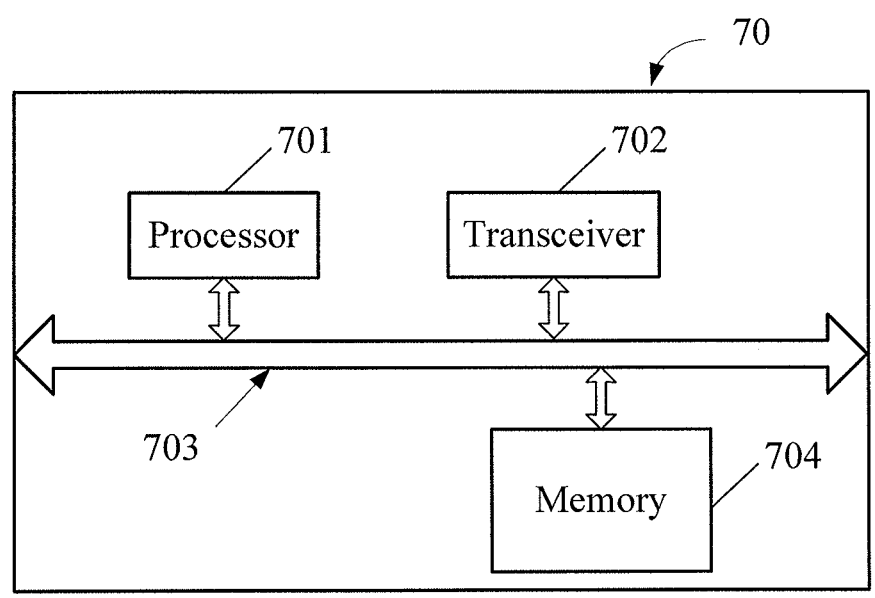
FIG. 7 is another schematic block diagram of a terminal equipment according to an embodiment of the disclosure.

It is to be noted that, in the embodiment of the disclosure, the receiving unit 601 may be implemented by a transceiver, and the determination unit 602 may be implemented by a processor. As illustrated in FIG. 7, a terminal equipment 70 may include a processor 701, a transceiver 702 and a memory 704.

Here, the transceiver 702 may be configured to receive configuration signaling, data and the like sent by a base station, and the transceiver 702 may be replaced with a receiver. The processor 701 may be configured to perform decoding and the like on TBs. The memory 704 may be configured to store instruction codes executed by the processor 701, and is configured to store TBs failed to be decoded and the like.

Various components in the terminal equipment 70 are coupled together through a bus system 703. Here, the bus system 703 includes a data bus, and further includes a power bus, a control bus and a state signal bus.

The terminal equipment 60 illustrated in FIG. 6 or the terminal equipment 70 illustrated in FIG. 7 may implement each process implemented in the method embodiment illustrated in FIG. 2, which will not be elaborated herein to avoid repetition.

Figure 8:
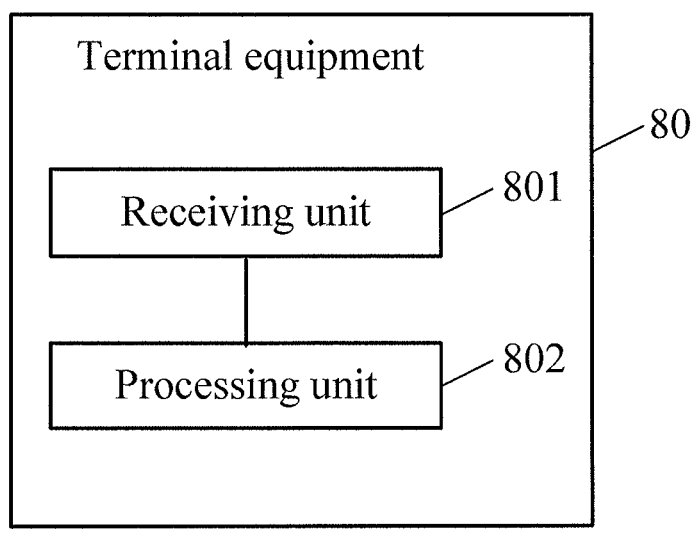
FIG. 8 is another schematic block diagram of a terminal equipment according to an embodiment of the disclosure.

FIG. 8 is another schematic block diagram of a terminal equipment according to an embodiment of the disclosure. The terminal equipment 80 illustrated in FIG. 8 includes a receiving unit 801 and a processing unit 802.

The receiving unit 801 is configured to receive a TB sent by a base station, the TB including multiple CBs.

The processing unit 802 is configured to fail to decode the TB received by the receiving unit 801, and determine to store the TB.

The processing unit 802 is further configured to determine a minimum to-be-stored bit number $n_{SB}$ of each CB in the TB.

Here, the processing unit 802 is specifically configured to: for a correctly decoded CB, determine $n_{SB}$ according to a system information length of the corresponding CB; and for other CBs, determine $n_{SB}$ according to a coded bit length input for the corresponding CB in a rate matcher of the base station.

Furthermore, the terminal equipment 80 may further include a storage unit, configured to store the TB.

Here, the processing unit 802 is specifically configured to: for the correctly decoded CB, determine $n_{SB}$ to be:

$n_{SB}=\min(K_\Pi, P)$, where $K_\Pi$ is the system information length of the corresponding CB, and a value of P is predefined by a standard or configured by the base station or calculated according to a predetermined method; and for the other CB, determine $n_{SB}$ to be:

$n_{SB}=(N_{cb}, Q)$, where $N_{cb}$ is the coded bit length input for the corresponding CB in the rate matcher of the base station, and a value of Q is predefined by a standard or configured by the base station or calculated according to a predetermined method.

As an example, the value(s) of P and/or Q may be sent to the terminal equipment 80 by the base station through control signaling. That is, the receiving unit 901 may further be configured to receive the control signaling sent by the base station.

Specifically, P and Q may refer to descriptions in the embodiment illustrated in FIG. 5, and will not be elaborated herein to avoid repetition.

Figure 9:
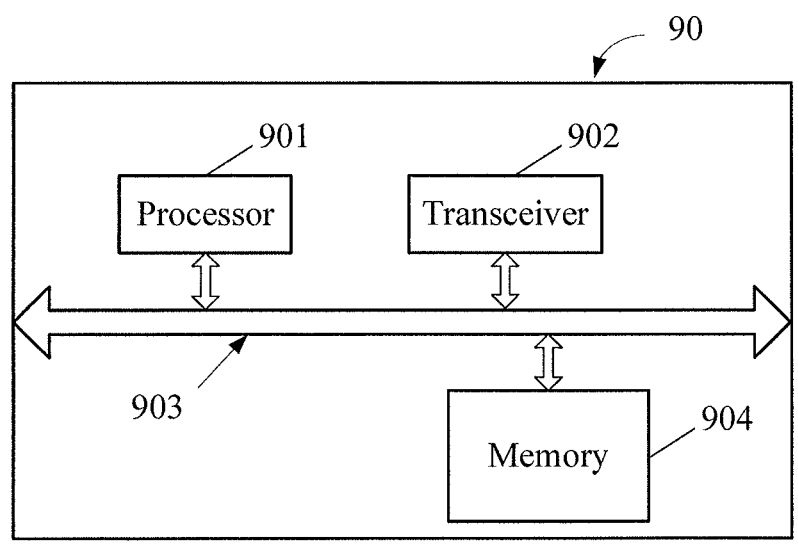
FIG. 9 is another schematic block diagram of a terminal equipment according to an embodiment of the disclosure.

It is to be noted that, in the embodiment of the disclosure, the receiving unit 901 may be implemented by a transceiver, and the processing unit 902 may be implemented by a processor. As illustrated in FIG. 9, a terminal equipment 90 may include a processor 901, a transceiver 902 and a memory 904.

Here, the transceiver 902 may be configured to receive configuration signaling, data and the like sent by a base station, and the transceiver 902 may be replaced with a receiver. The processor 901 may be configured to perform decoding and the like on a TB. The memory 904 may be configured to store instruction codes executed by the processor 901, and is configured to store the TB and the like.

Each component in the terminal equipment 90 is coupled together through a bus system 903, wherein the bus system 903 includes a data bus, and further includes a power bus, a control bus and a state signal bus.

The terminal equipment 80 illustrated in FIG. 8 or the terminal equipment 90 illustrated in FIG. 9 may implement each process implemented in the method embodiment illustrated in FIG. 5, which will not be elaborated herein to avoid repetition.

Figure 10:
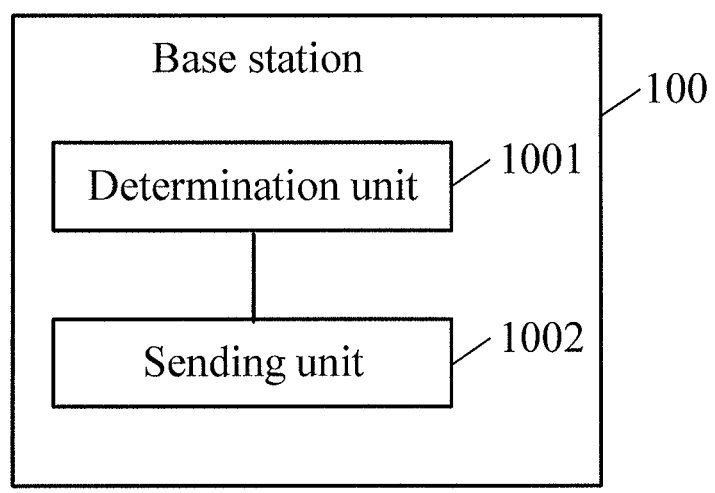
FIG. 10 is a schematic block diagram of a base station according to an embodiment of the disclosure.

FIG. 10 is a schematic block diagram of a base station according to an embodiment of the disclosure. The base station 100 illustrated in FIG. 10 includes a determination unit 1001 and a sending unit 1002.

The determination unit 1001 is configured to determine a first parameter.

The sending unit 1002 is configured to send configuration signaling to a terminal equipment, the configuration signaling being configured to indicate the first parameter determined by the determination unit 1001, to make a number of TBs stored in a buffer by the terminal equipment not smaller than the first parameter when a number of TBs received by the terminal equipment and failed to be decoded is not smaller than the first parameter.

Specifically, for different a terminal equipment, the first parameter determined by the base station 100 also has different values.

Optionally, the base station 100 may determine the first parameter according to at least one of the following factors: (1) a total number of aggregated carriers; (2) a total number of unlicensed carriers in the aggregated carriers; (3) a bandwidth of each CC; (4) a maximum HARQ process number in TDD CCs; and (5) a transmission mode on each CC. Here, the transmission mode may refer to a maximum space layer number, a maximum TB number and the like.

Optionally, the base station may also determine the first parameter according to other factors which will not be limited one by one, which will not be limited in the disclosure.

Optionally, as an embodiment, the configuration signaling includes the first parameter. If the first parameter is represented as $N_{num\_TB}$, the configuration signaling includes a value of $N_{num\_TB}$.

Optionally, as another embodiment, the configuration signaling includes a second parameter. The first parameter is represented as $N_{num\_TB}$, the second parameter is represented as $N_{refer}$, and $N_{num\_TB}=N_{refer} \times L$, where L is a predefined constant.

Optionally, the sending unit 1002 may further be configured to send control signaling or scheduling signaling to the terminal equipment, the control signaling or the scheduling signaling including a value of L.

Figure 11:
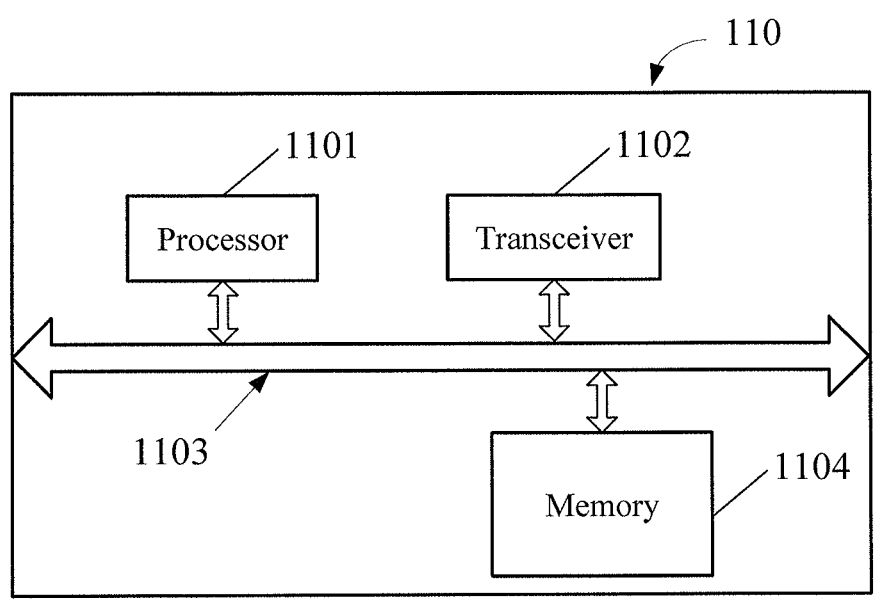
FIG. 11 is another schematic block diagram of a base station according to an embodiment of the disclosure.

It is to be noted that, in the embodiment of the disclosure, the determination unit 1001 may be implemented by a processor, and the sending unit 1002 may be implemented by a transceiver. As illustrated in FIG. 11, a base station 110 may include a processor 1101, a transceiver 1102 and a memory 1104.

Here, the transceiver 1102 may be configured to send configuration signaling, data and the like to a terminal equipment, and the transceiver 1102 may be replaced with a sender. The processor 1101 may be configured to determine a value of a first parameter and the like. The memory 1104 may be configured to store instruction codes executed by the processor 1101 and the like.

Various components in the base station 110 are coupled together through a bus system 1103, wherein the bus system 1103 includes a data bus, and further includes a power bus, a control bus and a state signal bus.

The base station 100 illustrated in FIG. 10 or the base station 110 illustrated in FIG. 11 may implement each process implemented in the method embodiment, which will not be elaborated herein to avoid repetition.

It can be understood that the processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment for convenient and brief description and will not be elaborated herein.

In some embodiments provided by the disclosure, it is to be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, various function units in each embodiment of the disclosure may be integrated into a processing unit, each unit may also exist independently, or two or more units may be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data storage method, comprising:
   receiving, by a terminal equipment, configuration signaling sent by a base station; and
   determining, by the terminal equipment, a first parameter according to the configuration signaling, wherein a number of Transport Blocks (TBs) stored in a buffer by the terminal equipment being not smaller than the first parameter when a number of TBs received by the terminal equipment and failed to be decoded is not smaller than the first parameter;
   the method further comprising:
   determining, by the terminal equipment, a minimum to-be-stored bit number $n_{SB}$ of each Coded Block (CB) in to-be-stored TBs which are failed to be decoded according to the first parameter;
   wherein determining the minimum to-be-stored bit number $n_{SB}$ of each CB comprises:
   for a correctly decoded CB, determining $$n_{SB} = \min\left(K_\Pi, \left\lfloor \frac{N'_{soft}}{C \cdot N_{num\_TB}} \right\rfloor\right),$$

and
   for other CBs, determining $$n_{SB} = \min\left(N_{cb}, \left\lfloor \frac{N'_{soft}}{C \cdot N_{num\_TB}} \right\rfloor\right),$$

where min represents minimalization, $\lfloor \bullet \rfloor$ represents rounding-down, $K_\Pi$ represents a system information length of the corresponding CB, $N_{cb}$ represents a coded bit length input for the corresponding CB in a rate matcher of the base station, C represents a number of the CBs comprised in the to-be-stored TBs which are failed to be decoded, $N'_{soft}$ represents one of total lengths of multiple buffers reported by the terminal equipment, and $N_{num\_TB}$ is the first parameter.

2. The method according to claim 1, wherein the configuration signaling comprises the first parameter.

3. The method according to claim 1, wherein the configuration signaling comprises a second parameter, and
   determining the first parameter comprises: determining the first parameter to be $N_{num\_TB} = N_{refer} \times L$,
   where the first parameter is represented as $N_{num\_TB}$, the second parameter is represented as $N_{refer}$, and L is a predefined constant.

4. The method according to claim 1, further comprising:
   after TBs sent by the base station are received, determining, by the terminal equipment, to-be-stored TBs which are failed to be decoded.

5. The method according to claim 4, wherein determining the to-be-stored TBs which are failed to be decoded comprises:
   when the number of the TBs received by the terminal equipment and failed to be decoded is not smaller than the first parameter, determining, by the terminal equipment, to store part or all of the TBs received by the terminal equipment and failed to be decoded.

6. The method according to claim 5, wherein determining, by the terminal equipment, to store part or all of the TBs received by the terminal equipment and failed to be decoded comprises:
   storing, by the terminal equipment, part or all of the TBs received by the terminal equipment and failed to be decoded according to priorities,
   wherein the TBs transmitted on a Primary Cell (PCell) and failed to be decoded have a first priority, the TBs transmitted on a Secondary Cell (SCell) and failed to be decoded have a second priority, and the TBs transmitted on an unlicensed carrier and failed to be decoded have a third priority.

7. A terminal equipment, comprising:
   a transceiver, configured to receive configuration signaling sent by a base station;
   a processor; and
   a memory for storing instructions executable by the processor,
   wherein the processor is configured to: determine a first parameter according to the configuration signaling, wherein a number of Transport Blocks (TBs) stored in a buffer by the terminal equipment being not smaller than the first parameter when a number of TBs received by the terminal equipment and failed to be decoded is not smaller than the first parameter; and
   determine a minimum to-be-stored bit number $n_{SB}$ of each Coded Block (CB) in to-be-stored TBs which are failed to be decoded according to the first parameter;
   wherein the processor is specifically configured to: determine $n_{SB}$ to be:
   for a correctly decoded CB, $$n_{SB} = \min\left(K_\Pi, \left\lfloor \frac{N'_{soft}}{C \cdot N_{num\_TB}} \right\rfloor\right),$$

and
   for other CBs, $$n_{SB} = \min\left(N_{cb}, \left\lfloor \frac{N'_{soft}}{C \cdot N_{num\_TB}} \right\rfloor\right),$$

where min represents minimalization, $\lfloor \bullet \rfloor$ represents rounding-down, $K_\Pi$ represents a system information length of the corresponding CB, $N_{cb}$ represents a coded bit length input for the corresponding CB in a rate matcher of the base station, C represents a number of the CBs comprised in the to-be-stored TBs which are failed to be decoded, $N'_{soft}$ soft represents one of total lengths of multiple buffers reported by the terminal equipment, and $N_{num\_TB}$ is the first parameter.

8. The terminal equipment according to claim 7, wherein the configuration signaling comprises the first parameter.

9. The terminal equipment according to claim 7, wherein the configuration signaling comprises a second parameter, and
   the processor is specifically configured to: determine the first parameter to be $N_{num\_TB} = N_{refer} \times L$,
   where the first parameter is represented as $N_{num\_TB}$, the second parameter is represented as $N_{refer}$, and L is a predefined constant.

10. The terminal equipment according to claim 7, wherein the processor is further configured to:
    after TBs sent by the base station are received, determine to-be-stored TBs which are failed to be decoded.

11. The terminal equipment according to claim 10, wherein the processor is specifically configured to:

when the number of the TBs received by the terminal equipment and failed to be decoded is not smaller than the first parameter, determine to store part or all of the TBs received by the terminal equipment and failed to be decoded.

* * * * *

UNITED STATES PATENT AND TRADEMARK OFFICE
CERTIFICATE OF CORRECTION

Page 1 of 1

PATENT NO. : 10,595,323 B2
APPLICATION NO. : 15/738047
DATED : March 17, 2020
INVENTOR(S) : Bin Feng It is certified that error appears in the above-identified patent and that said Letters Patent is hereby corrected as shown below:

On the Title Page

Item (73) Assignee:
"Guangdong Oppo Mobile Telecommunications Corp., Ltd., Dongguan, Guangdfong (CN)"
Is changed to:
--GUANGDONG OPPO MOBILE TELECOMMUNICATIONS CORP., LTD., Dongguan, Guangdong (CN)--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*